(No Model.) 8 Sheets—Sheet 1.
W. MASON.
MACHINE FOR DRILLING GUN BARRELS.
No. 596,782. Patented Jan. 4, 1898.
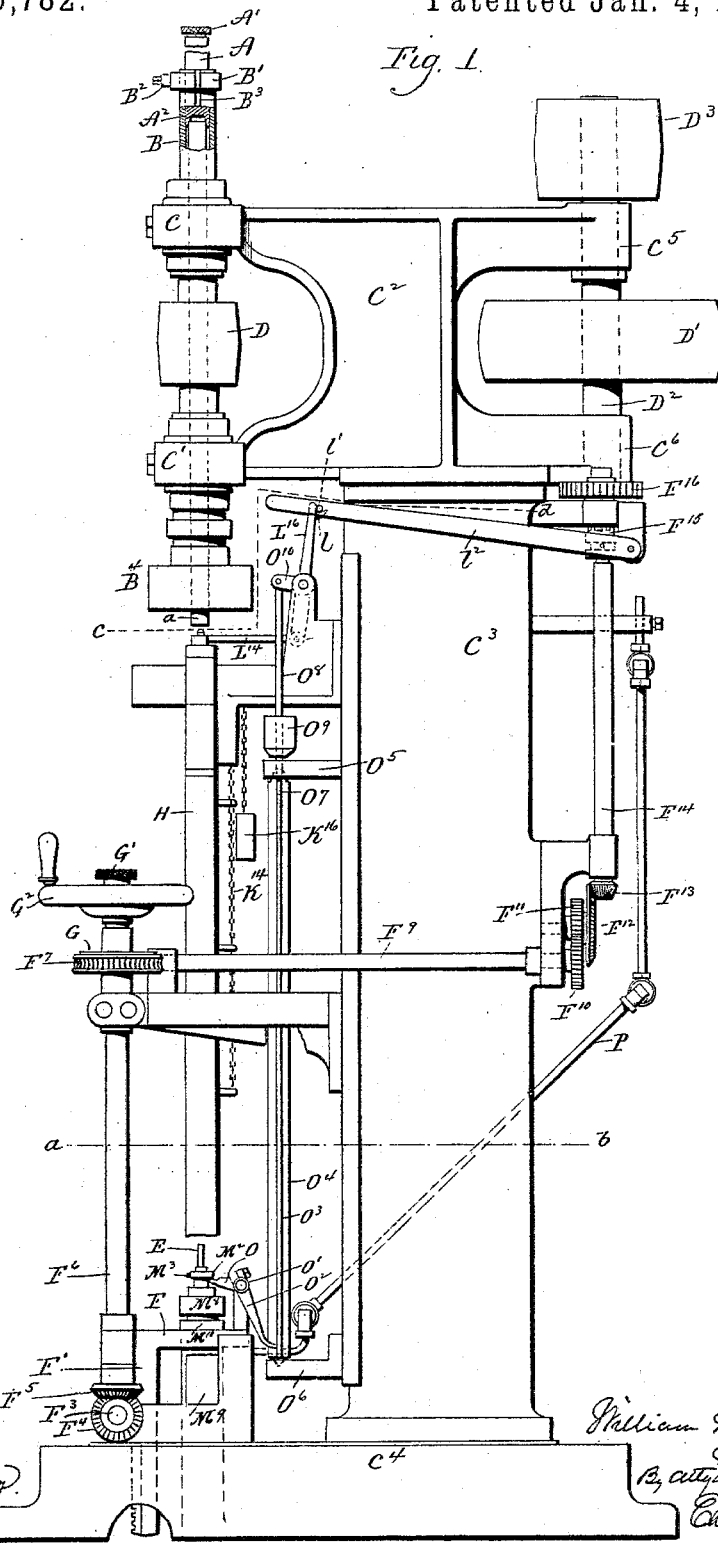
Witnesses
William Mason, Inventor
By atty.

(No Model.)   8 Sheets—Sheet 2.
W. MASON.
MACHINE FOR DRILLING GUN BARRELS.
No. 596,782.   Patented Jan. 4, 1898.
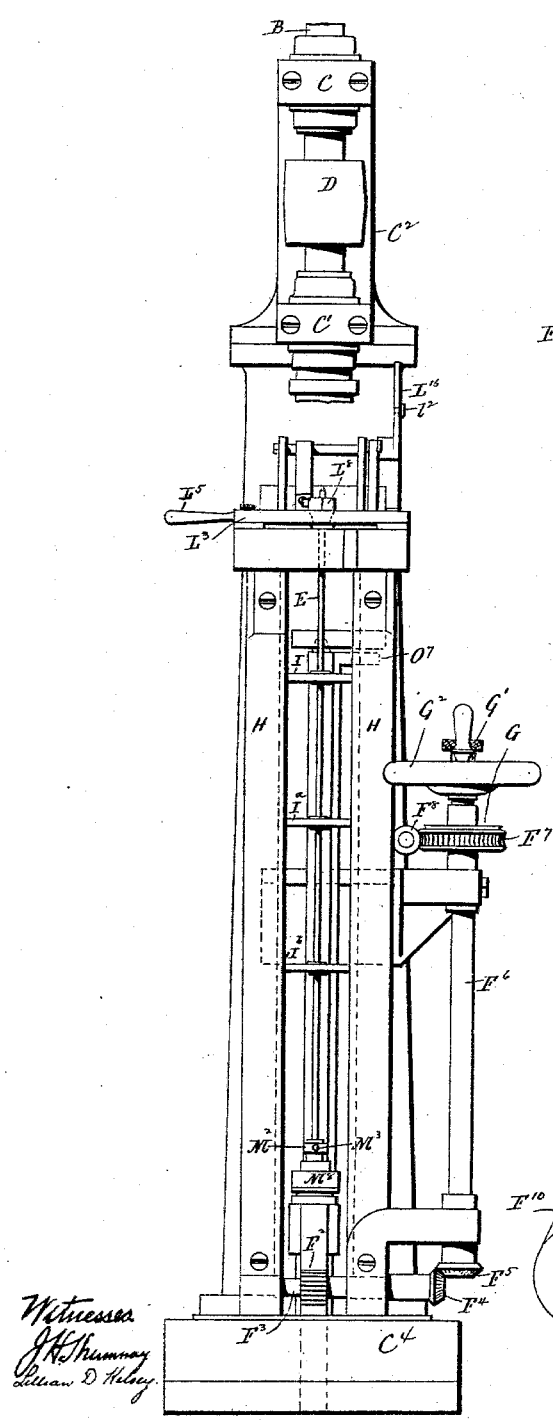
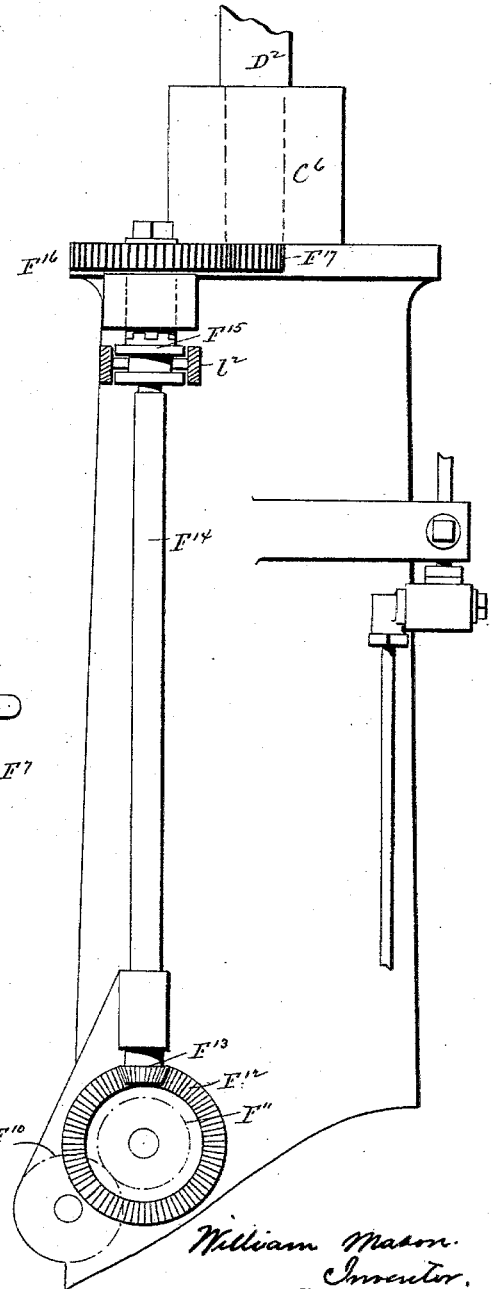

(No Model.) 8 Sheets—Sheet 3.
W. MASON.
MACHINE FOR DRILLING GUN BARRELS.
No. 596,782. Patented Jan. 4, 1898.
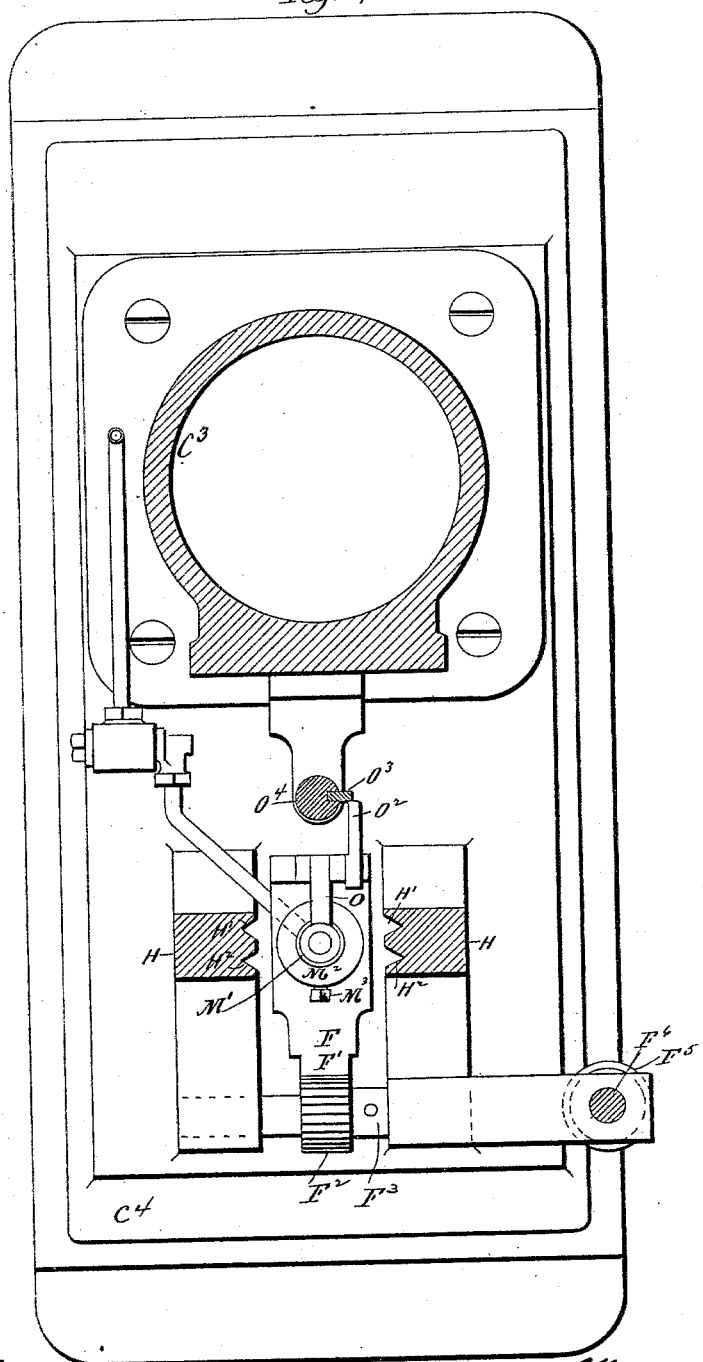

(No Model.)  8 Sheets—Sheet 4.
W. MASON.
MACHINE FOR DRILLING GUN BARRELS.

No. 596,782.  Patented Jan. 4, 1898.

Witnesses.  William Mason, Inventor,
By atty.

(No Model.) 8 Sheets—Sheet 5.
W. MASON.
MACHINE FOR DRILLING GUN BARRELS.
No. 596,782. Patented Jan. 4, 1898.
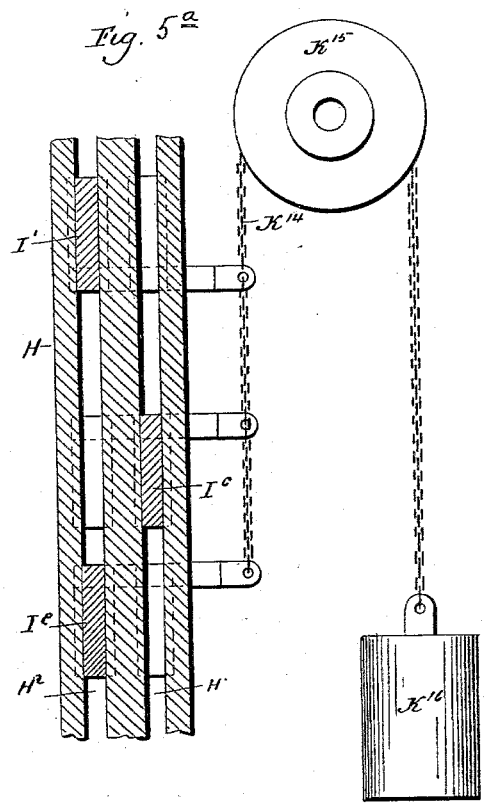

(No Model.) 8 Sheets—Sheet 6.
W. MASON.
MACHINE FOR DRILLING GUN BARRELS.
No. 596,782. Patented Jan. 4, 1898.
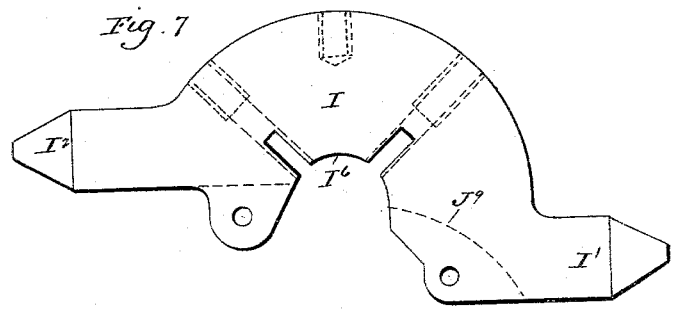
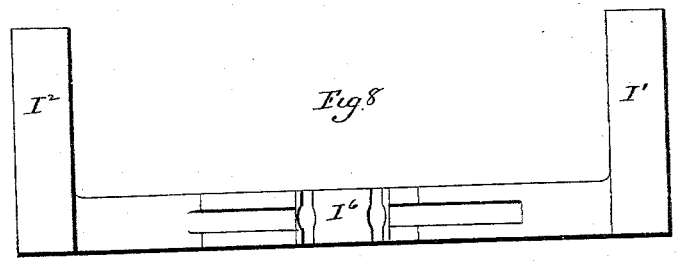
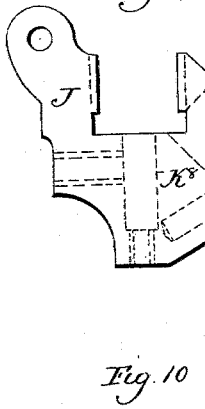
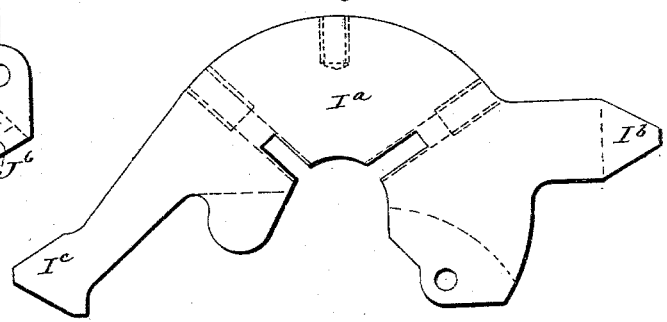
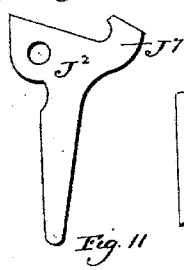
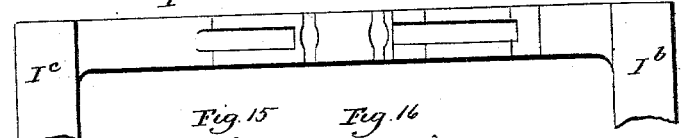
Witnesses.
J. H. Shumway
Lillian D. Kelsey
William Mason,
Inventor,
By Atty
Earle Seymour (No Model.) 8 Sheets—Sheet 7.

W. MASON.
MACHINE FOR DRILLING GUN BARRELS.

No. 596,782. Patented Jan. 4, 1898.

Witnesses
J. H. Thurnay
Lillian D. Kelsey

William Mason,
Inventor,
By Att'ys Earle & Seymour

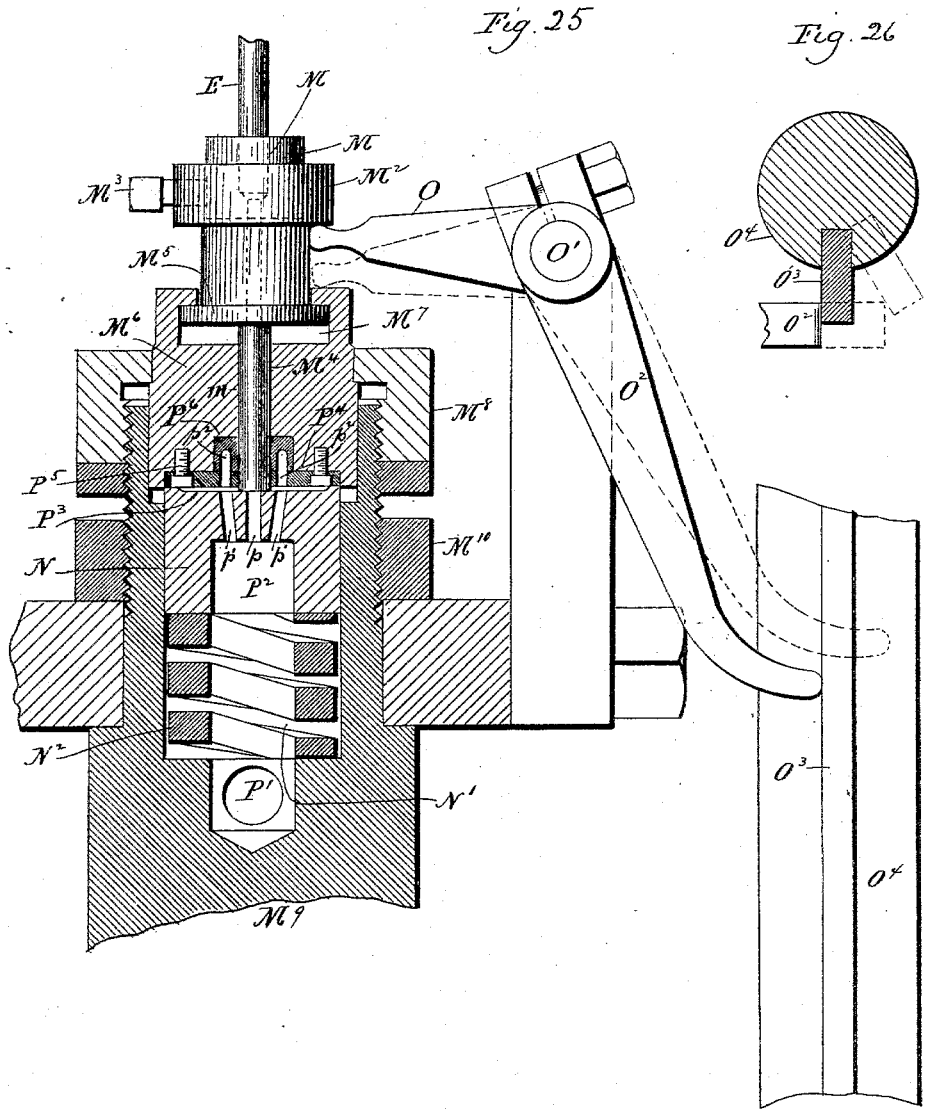

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

MACHINE FOR DRILLING GUN-BARRELS.

SPECIFICATION forming part of Letters Patent No. 596,782, dated January 4, 1898.

Application filed June 14, 1897. Serial No. 640,725. (No model.)

*To all whom it may concern:*

Be it known that I, WILLIAM MASON, of New Haven, in the county of New Haven and State of Connecticut, have invented a new Improvement in Machines for Drilling Gun-Barrels; and I do hereby declare the following, when taken in connection with the accompanying drawings and the letters of reference marked thereon, to be a full, clear, and exact description of the same, and which said drawings constitute part of this specification, and represent, in—

Figure 5:
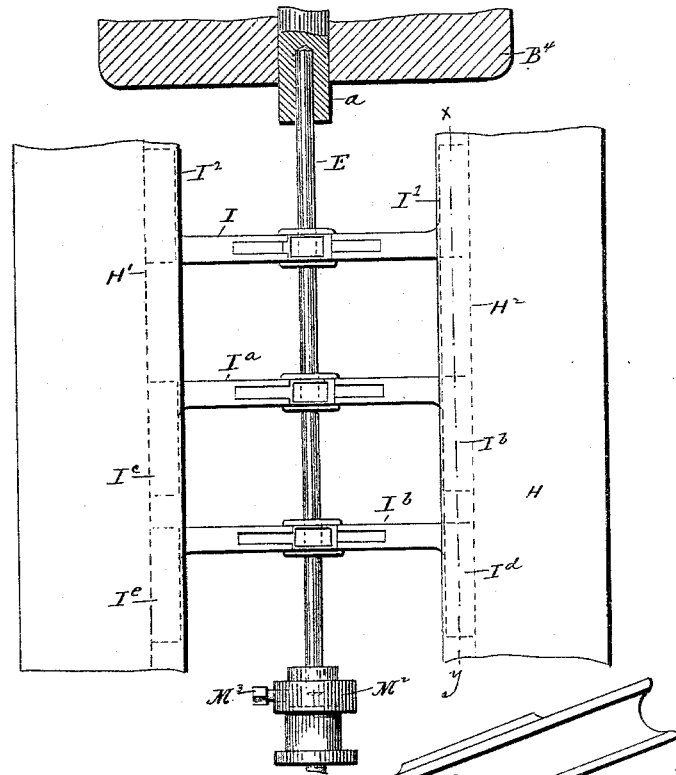
Figure 6:
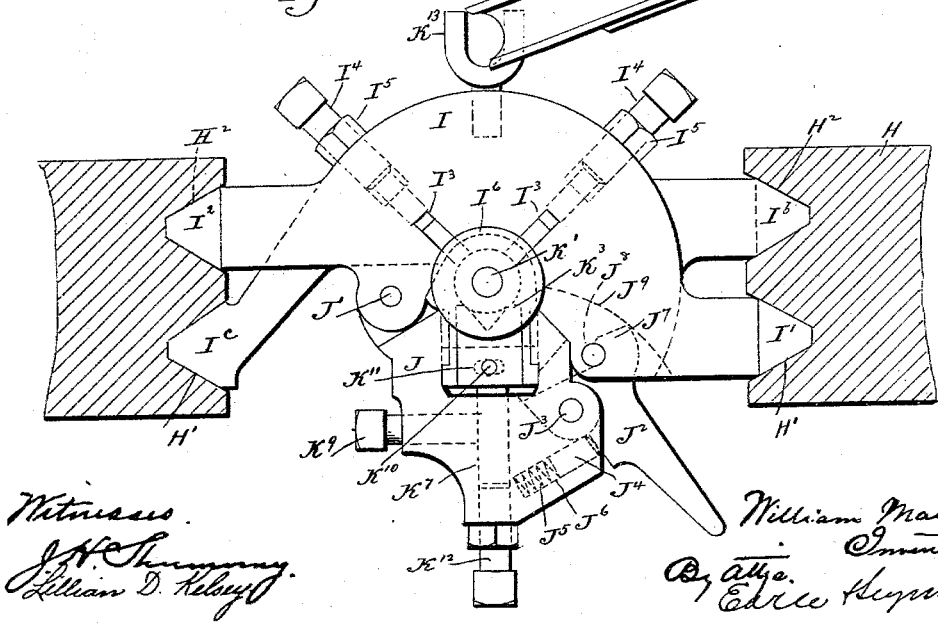
Figure 21:
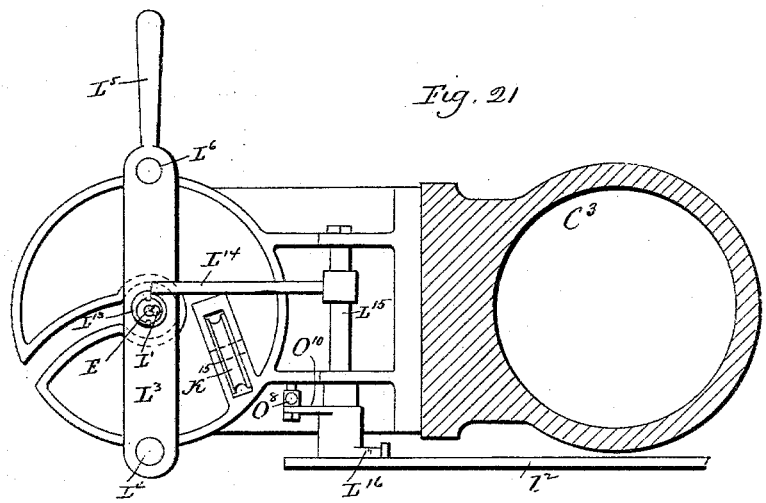
Figure 22:
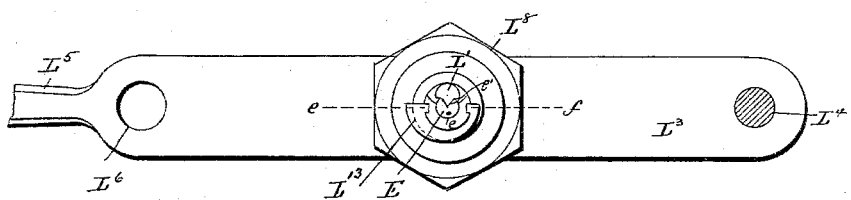
Figure 23:
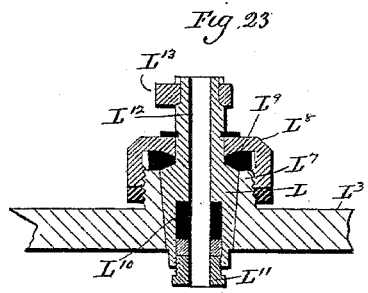
Figure 24:
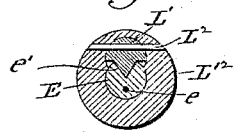

Figure 1, a view in side elevation of one form which a machine constructed in accordance with my invention may assume; Fig. 1$^a$, a view in cross-section of such a drill as may be employed in my machine; Fig. 2, a broken view of the machine in front elevation; Fig. 3, a similar but less comprehensive view thereof in rear elevation; Fig. 4, a view, partly in plan and partly in horizontal section, on the line $a\ b$ of Fig. 1; Fig. 5, a broken view in front elevation, showing the drill, the guides therefor, the uprights in which the guides are supported, and the lower end of the universal chuck, which is shown as holding a gun-barrel into which the upper end of the drill has just been entered; Fig. 5$^a$, a sectional view on line $x\ y$ of Fig. 5; Fig. 6, a full-sized plan view of the guides, also showing in transverse section the uprights in which they travel; Fig. 7, a detached view of the plate of the upper guide; Fig. 8, a similar view of the same in front elevation; Fig. 9, a detached view of the gate of the guide; Fig. 10, a similar view of the locking-lever thereof; Fig. 11, an edge view of the centering-block of the guide; Fig. 12, a plan view thereof; Fig. 13, a detached plan view of the T-shaped holder to which the centering-block is attached; Fig. 14, a view thereof in inner end elevation; Fig. 15, a plan view of one of the bushings; Fig. 16, a view thereof in side elevation; Fig. 17, an end view of one of the centering-pieces of the guide; Fig. 18, a plan view thereof; Fig. 19, a plan view of the plate of the middle guide; Fig. 20, a broken view thereof in front elevation; Fig. 21, a view of the drill in horizontal section on the line $c\ d$ of Fig. 1; Fig. 22, a detached view of the gate which contains the conical bushing of the torsion knock-off mechanism; Fig. 23, a view thereof in vertical central section on the line $e\ f$ of Fig. 22; Fig. 24, a view in horizontal section, showing how the knock-off bushing is keyed to the drill; Fig. 25, a view in vertical section, showing the pressure knock-off device; Fig. 26, a view in transverse section of the oscillating shaft $O^4$, showing also the knock-off lever and the knock-off web with which the same coacts.

My invention relates to an improvement in machines for drilling gun-barrels, the object being not only to facilitate the drilling of gun-barrels even when they are of the toughest description, but also to drill them with such accuracy that the subsequent finishing operations are simplified and cheapened.

With these ends in view my invention consists in a machine for drilling gun-barrels having means for supporting and revolving a gun-barrel in a vertical position, a drill located below and in line with the said means and entering the lower end of the barrel, from which the chips are cleared in part by the action of gravity, and also having certain other instrumentalities, as will be hereinafter described.

My invention further consists in means for supporting and rotating a gun-barrel in a vertical position, a vertically-movable drill located below the said means and drilling the barrel from the bottom upward, and two or more drill-guides arranged to be automatically picked up one after the other as the drill is lifted.

My invention further consists in the combination with a vertically-arranged drill, feeding connections therefor, and a torsion knock-off device for stopping the said connections when the torsional strain upon the drill exceeds a predetermined amount.

My invention further consists in a vertically-arranged drill, of feeding connections therefor, and a pressure knock-off device for stopping said connections when the end thrust or pressure upon the drill exceeds a predetermined amount.

My invention further consists in certain details of construction and combinations of parts, as will be hereinafter described, and pointed out in the claims.

In carrying out my invention, as herein shown, I employ a vertically-arranged rod-like gage A, provided at its upper end with a knob A' and having a conical socket $A^2$ formed in its lower end. The lower end of this gage is entered into the upper end of a vertically-arranged revolving tubular spindle B, in which it is held in any position of vertical adjustment by means of a clamp-collar B', furnished with a clamp-screw $B^2$, which is employed to tighten the collar upon the upper end of the spindle, which is vertically slotted, as at $B^3$, for the purpose of permitting it to be clamped upon the said gage. The said tubular spindle is mounted in bearings C C', located one above the other and forming a part of the head $C^2$, which is mounted upon the upper end of a very heavy hollow pillar $C^3$, supported upon a base or pedestal $C^4$, which in turn is supported upon foundations of the heaviest description. At a point between the bearings C and C' the spindle is furnished with a driving-pulley D, receiving a belt from a driven pulley D', mounted upon a vertically-arranged driving-shaft $D^2$, journaled in bearings $C^5$ $C^6$ of the head $C^2$ and provided at its projecting upper end with a driving-pulley $D^3$, which is driven from any convenient source of power. The projecting lower end of the tubular spindle B is furnished with a universal chuck $B^4$, which I shall not describe in detail, as such chucks are well known and exist in a great variety of forms available for use in this situation. The said tubular spindle B is large enough in diameter and long enough to receive and clear the largest barrels which will ever be drilled in the machine, into which the barrels are introduced through the open lower end of the spindle and through the chuck at that point. A barrel $a$ so introduced into the spindle is lifted until its upper end is centered and seated in the conical socket $A^2$, formed in the lower end of the adjustable gage A, after which the chuck is operated to firmly grip the barrel by its lower end. Thereafter the barrel rotates with the spindle, but it is not longitudinally movable.

It will be of course understood that the gage A is raised and lowered and set in the upper end of the spindle according to the length of the barrels to be drilled, the gage being initially set by trying a barrel in the spindle. Directly below the spindle and in line with the longitudinal axis thereof I locate the drill E, which is of course vertically arranged. This drill may be of any approved construction, but however constructed it must have a longitudinal passage for oil and an external longitudinal passage for the discharge of chips and oil.

One form which the drill may assume is shown in Fig. 1ª, which represents a drill in cross-section, so as to show its provision with an oil-passage $e$ and a chip-passage $e'$.

I may here pause to say that inasmuch as the barrel is located in a vertical position at a point above the drill the chips produced in drilling the barrel will steadily fall by the action of gravity out of the lower end of the barrel, which is thus kept constantly clear of chips. The action of gravity in this respect is supplemented by the flow of oil, which is forced upward through the drill to its cutting-point under high pressure and which is also forced out of the barrel under high pressure. The oil being under pressure thus not only serves to lubricate the edge of the drill, but also to free the same from chips and, further, to assist the action of gravity in clearing the barrel of chips.

The advantages secured by me in drilling the barrel in a vertical position, so that the action of gravity and the flow of oil may be availed of for clearing it of chips, are too obvious to require enumeration, for it is well known that when gun-barrels are drilled in horizontal positions or from the top down in vertical positions the machines must frequently be stopped to permit the barrels to be cleared of chips, and even then the chips retard the action of the drills and cause the same to be forced out of line and to "lead off," so as to drill imperfectly.

The drill E is connected through instrumentalities which I will describe at a later time with the inwardly-turned arm F of a vertically-reciprocating feeding-rack F', the lower end of which is extended downward through the base $C^4$ of the machine and which is adapted in length to raise and lower the drill through a distance represented by a little more than the longest gun-barrel which it is ever designed to bore in the machine. The teeth of the rack are formed upon its outer face and mesh into a pinion $F^2$, mounted upon a short horizontal shaft $F^3$, one end of which is formed with a bevel-gear $F^4$, meshing into a bevel-gear $F^5$, located at the lower end of a vertical shaft $F^6$, provided with a worm-gear $F^7$, driven by a worm $F^8$, mounted on a horizontal shaft $F^9$, provided with a pinion $F^{10}$, meshing into a pinion $F^{11}$, with which is connected a bevel-gear $F^{12}$, meshing into a bevel-pinion $F^{13}$, located at the lower end of a vertically-arranged shaft $F^{14}$, the upper end of which is provided with a clutch $F^{15}$, which couples the shaft with a gear-wheel $F^{16}$, which in turn meshes into a driving-pinion $F^{17}$, located at the lower end of the driving-shaft $D^2$, before mentioned. This train of driving connections between the driving-shaft $D^2$ and the rack is an illustrative connection and may be varied according to the dictation of circumstances. Through the medium of the said rack the drill is slowly lifted into the gun-barrel, which is meanwhile rapidly rotated within and by the tubular spindle before described. Instead of reversing the machine for withdrawing the drill from the barrel I prefer to disconnect the drill from its driving connections and withdraw the drill by running the rack back manually. In order to do this, the worm-gear $F^7$ is frictionally connected with the shaft $F^6$ by means of a friction-cone G, which is raised and lowered by means of an operating-knob G', which is connected with the cone by means not necessary to show, as such devices are old. After the worm-gear has been disconnected from the shaft F⁶ the shaft is rotated by means of its hand-wheel G².

The drill, being very long and slender and having heavy endwise thrust imposed upon it when it is performing its work, is preferably supported and guided by means of two or more vertically-movable guides. As herein shown, three of such guides are employed, the same being located between two corresponding uprights H H, the inner edges of which are formed with V-shaped guideways H' H². (Best shown in Fig. 6.) Although the guides are constructed on exactly the same principle, they are differentiated from each other slightly in order to permit them to come close together as they are automatically picked up one by one in the elevation of the drill. It will suffice for the purposes of description to describe the upper and middle guides, the lower guide being like the middle guide, with the exception of a slight difference in construction for a different application to the guideways of the uprights H. The upper guide consists of a plate I, having two upwardly-projecting feet I' I² of angular cross-section, which corresponds to the cross-section of the guideways H' and H². These feet are not in line with each other, but staggered, so that the foot I² will enter the guideway H² of the left-hand upright H, while the foot I' will enter the diagonally opposite guideway H' of the right-hand upright H. The said plate is furnished with two radially-arranged centering-pieces I³ I³, which are held in place and adjusted by means of set-screws I⁴ I⁴, locked by jam-nuts I⁵ I⁵, the inner ends of the said centering-pieces, which are non-rotatable, although longitudinally movable, extending beyond the walls of a concave seat I⁶, formed in the center of the plate. The said plate is also formed with a horizontally-swinging gate J, hung on a vertical pivot J' and furnished with a pivotal locking-lever J², hung on a vertical pivot J³ and thrown into and held in its locking position by means of a plunger J⁴ and a spring J⁵, located in a cylindrical socket J⁶, formed in the gate. The hooked nose or beak J⁷ of the locking-lever engages with a locking-pin J⁸, mounted in the plate, which for the purpose of rendering the pin accessible to the beak or hook of the said lever is formed with a horizontal slot or groove J⁹, entering its forward edge. The office of the gate is to shut in and hold a bushing K, the central opening K' of which is just large enough for the passage through it of the drill, the upper and lower edges of the bushing being formed with flanges K² K², by means of which it is held against vertical displacement in the guide. The bushing is centered in the guide by means of the two centering-pieces I³ I³, before described, and a centering-block K³, having its inner end formed with a V-shaped vertical notch K⁴, which coacts with the bushing at points opposite the coaction therewith of the centering-pieces I³ I³, as shown in Fig. 6. The outer end of the centering-block K³ is formed with a horizontal slot K⁵, Fig. 13, which receives the transversely-arranged head K⁶ of a T-shaped holder, having also a stem K⁷, which is received by a hole K⁸, Fig. 9, formed in the gate J, and which is furnished with a set-screw K⁹ for engaging with the said stem and holding the holder aforesaid in place in the gate. The block K³ is connected with the holder, so as to be laterally movable with respect thereto, by means of a pin K¹⁰, which passes through a transversely-arranged slot K¹¹, formed in the transverse head K⁶ of the holder.

It will be understood from the foregoing that the centering-block K³ is enabled, by means of the construction described, to adjust itself laterally in the guide to accommodate any slight variations in position which the bushing may have to take to compensate for defects of construction or for wear.

The stem K⁷ of the holder is adjusted by means of a set-screw K¹², mounted in the gate, as shown clearly in Fig. 6. The plate I of the guide is provided upon its inner edge with a yoke K¹³ for the connection of the guide with a chain K¹⁴, which is also connected with the other guides, as shown in Fig. 5ª, and which passes over a pulley K¹⁵ and supports at its opposite end a counterbalance K¹⁶, which is proportioned to the weight of the guides connected with it, so that they will be sustained in any position in which they may be placed. The plate Iª of the middle guide is shown in Figs. 19 and 20 to illustrate the differentiation of the middle guide from the upper guide, which has now been described in detail. The feet Iᵇ and Iᶜ of the said plate Iª are turned downward instead of upward and are oppositely staggered, the foot Iᵇ entering the guideway H² of the right-hand upright H and the foot Iᶜ entering the guideway H' of the left-hand upright H. By staggering the feet of the plates of the upper and middle guides, as described, the feet of the upper guide are cleared from the feet of the lower guide, so that the middle guide may be lifted into direct contact with the lower face of the upper guide. In the same manner the feet Iᵈ and Iᵉ of the plate of the lower guide are staggered, so as to clear in the guideways the downwardly-turned feet Iᵇ and Iᶜ of the plate Iª of the middle guide, so that the lower guide may be lifted into direct contact with the lower face of the middle guide, and so on, in case more than three guide are employed. The staggering or dodging of the feet of the guides clearly apppears in Fig. 5ª.

I may now explain that preparatory to introducing the drill into the machine bushings corresponding in number to the number of guides employed are slipped over it. Then when the drill is in place the gates of the several guides are opened and the bushings picked up one by one and locked into the guides in which they are centered. The guides themselves are connected with the chain $K^{14}$, so as to afford a bearing for the drill at about equal distances throughout its length, though any arrangement of the guides may be adopted which is found to be the most advantageous. When the drill has been lifted by means of the rack for about one-third of its length, the lower guide is picked up and gradually lifted until it meets the middle guide, which is then picked up, after which the lower and middle guides are lifted until they meet the upper guide, which is then picked up, after which the three guides are lifted together until the completion of the drilling operation. Then when the drill is lowered the guides return to their original positions, provided they are not held up by friction. Preparatory to the removal of the drill the gates of the guides are opened to permit the bushings to be removed with the drill. As stated before, the number of guides may be varied, as desired, and will depend upon the length of drill employed. Moreover, the particular construction of the guides may be varied as found necessary.

The drill being held against rotation has to resist the torsional strains imposed upon it by the work, and as the drill itself is very long and slender these strains may endanger it. For the purpose, therefore, of preventing the drill from being twisted when the torsional strain upon it becomes too great, from whatever cause, I provide what I shall call, for want of a better term, a "torsion knock-off device," which acts upon the feeding connections of the drill so as to cut off the power therefrom, so as to stop the drill from being fed. This torsion knock-off device is put into operation by means of a partial rotation of the drill, which is held against rotation by friction, the holding power of which is such that it will hold the drill against rotation up to the danger-point, but when that point is passed allow the drill to rotate. For the purpose of thus frictionally holding the drill I employ a conical bushing L, non-rotatably coupled with the drill by means of a key $L'$, held in place by a pin $L^2$, as seen in Fig. 24. It is to be understood, however, that the drill is free to move up and down through the bushing. The said bushing is itself mounted in a horizontally-arranged gate $L^3$, located just below the universal chuck $B^4$, the gate being swung at one end on a stud $L^4$ and provided at its opposite end with a handle $L^5$ and formed near the handle with a vertical hole $L^6$, receiving a pin, by means of which it is locked in its closed position, which may be done in any other suitable way. Midway of its length the gate is formed with an upwardly-extending externally-threaded hub $L^7$, having a flaring opening, into which the conical bushing L is set and in which it is retained by means of a nut $L^8$, between which and the upper end of the hub a friction-washer $L^9$ is interposed. The lower end of the hub of the conical bushing is recessed to receive a packing-washer $L^{10}$, held in place by means of a nut $L^{11}$, inserted into the extreme lower end of the bushing. The upper end of the bushing is reduced to form a stem $L^{12}$, projecting upward through the hub $L^7$ and nut $L^8$ and furnished at its projecting upper end with a knock-off cam $L^{13}$, which coacts with a horizontal knock-off lever $L^{14}$, the rear end of which is secured to a rock-shaft $L^{15}$, Fig. 21, upon which is mounted a lever $L^{16}$, the upper end of which is furnished with a step $l$, adapted to be engaged by a pin $l'$, mounted in the outer end of a clutch-lever $l^2$, which carries the clutch $F^{15}$ before mentioned. Normally the knock-off cam $L^{13}$ will not act; but in case the torsional strain upon the drill should exceed the frictional resistance imposed upon the conical bushing the bushing will turn with the drill. As the bushing turns its knock-off cam $L^{13}$ coacts with the horizontal knock-off lever $L^{14}$, which turns the shaft $L^{15}$, which moves the lever $L^{16}$, so as to disengage its seat $l$ from the pin $l'$, mounted in the clutch-lever $l^2$, which will then drop, carrying the clutch with it and disconnecting the gear $F^{16}$ from the shaft $F^{14}$, whereby the drill, being cut off from the power, is stopped and breakage of the drill prevented. It is obvious that this torsion knock-off mechanism may be varied in details of its construction.

I have also shown, although I do not necessarily employ, another knock-off, which from the character of its operation I may call a "pressure knock-off," as it is designed to be operated when the downward end thrust of the drill, from whatever cause, exceeds a predetermined downward end thrust.

The butt or lower end of the drill is set into a socket M, formed in a cylindrical drill-holder $M'$, in which the drill is rigidly secured in any desired manner. The said drill-holder $M'$ is inserted into a recess formed to receive it in the upper end of a rotatable drill-chuck $M^2$, furnished with a set-screw $M^3$, which impinges against the drill-holder for securing the same in place in the chuck. The drill-holder $M'$ is also formed with an integral oil-tube $M^4$, which passes downward through and projects below the chuck. The said chuck is formed at its lower end with a flange $M^5$, adapting the chuck to be rotatably mounted in the projecting upper end of a block $M^6$, having a transverse slot $M^7$, which receives the flanged lower end of the chuck, the slot being enough deeper than the flange is wide to permit the flange to move vertically in it, as will be hereinafter described. It is necessary to provide for the rotation of the drill-chuck $M^2$ in the block $M^6$, so as to allow the drill to rotate as required for the action of the torsion knock-off device, which has already been described. The block $M^6$ is fitted tightly into a large nut $M^8$, which is applied to the threaded upper end of the drill-guiding spindle $M^9$, which is rigidly secured to the horizontal arm F of the rack $F'$ by means of a jam-nut $M^{10}$, as shown in Fig. 25. The lower end of the said drill-guiding spindle extends downward through the base or pedestal $C^4$ of the machine through a suitable bearing. (Not shown.) It will be understood, of course, that this spindle is as long as the rack $F'$ and coacts with the rack in guiding the rack throughout its long reciprocatory movement. The oil-tube $M^4$, before mentioned, passes downward through a central passage $m$, formed in the block $M^6$, and finds a seat upon the center of the upper face of a plunger N, which is located directly below the block $M^6$ in a cylindrical chamber $N'$, formed in the upper end of the spindle $M^9$, the block $M^6$ being loosely set into the upper end of the said chamber, in which it is free to rotate with the nut. The plunger N is supported upon a very heavy spiral spring $N^2$, located in the bottom of the chamber $N'$ and regulated in tension by turning the nut $M^8$ in one direction or the other, so as to support the drill E under ordinary conditions of downward end thrust through the medium of the drill-holder $M'$, the drill-chuck $M^2$, and the oil-tube $M^4$, which rests upon the plunger. In case the said thrust upon the plunger ever exceeds the supporting power of the spring the same will be compressed by the transmission of the thrust upon the spindle to the plunger and spring through the oil-tube $M^4$, which at its lower end is seated upon the plunger. When the spring is compressed as described, the drill will descend, and with it the drill-chuck, which is vertically movable, as before mentioned, in the slot $M^7$ in the block $M^6$. As the drill-chuck descends it depresses a rock-arm O, mounted upon a rock-shaft $O'$, carrying a knock-off lever $O^2$, the rearwardly-curved lower end of which coacts at any position of the drill with what I may term a "knock-off web" $O^3$, formed upon a vertically-arranged oscillating shaft $O^4$, journaled at its upper and lower ends in arms $O^5$ and $O^6$, as seen in Fig. 1. The upper end of the web $O^3$ terminates in a horizontal extension $O^7$, which normally supports a pendent rod $O^8$, carrying a weight $O^9$ and suspended from an arm $O^{10}$, mounted on the rock-shaft $L^{15}$, before described. When the tension of the spring $N^2$ is overcome and the spring is compressed, the rock-arm O is depressed and the knock-off lever $O^2$ pushed against the web $O^3$, with the effect of rotating the shaft $O^4$ and causing the extension $O^7$ of the web $O^3$ to be pushed out from under the pendent rod $O^8$, which is then pulled down by its weight $O^9$, whereby the rock-shaft $L^{15}$ is turned so as to swing the lever $L^{16}$ in such manner that its bracket $l$ is disengaged from the pin $l'$ of the clutch-lever $l^2$, which then drops and carries with it the clutch $F^{15}$, whereby the pinion $F^{16}$ is disconnected from the shaft $F^{14}$ and the power cut off from the drill. It will thus be seen that, as herein shown, my improved drill is provided not only with a torsion knock-off, but also with a pressure knock-off; but these devices are not imperative, nor, if employed, need they be constructed as detailed.

As herein shown, oil is supplied from any convenient source and under any desired pressure through a system of jointed pipes P to a transverse port $P'$, formed near the upper end of the drill-guiding spindle $M^9$, the inner end of the said port intersecting the lower end of the chamber $N'$, formed in the upper end of the said spindle. From the said port the oil rises through the spring $N^2$ into a chamber $P^2$, formed in the bottom of the plunger N, the upper end of which is formed with a central perpendicular duct $p$ and four outwardly-inclined ducts $p'$, of which two are shown. The duct $p$ communicates directly with the lower end of the oil-tube $M^4$, which conveys the oil directly to the bottom of the drill, as seen in Fig. 25. The ducts $p'$ convey a portion of the oil to a very shallow recess $P^3$, formed in the top of the plunger N and designed to receive enough of the oil to equalize the oil-pressure on both sides of the plunger, so that the pressure of the oil will not be added to the pressure of the spring in holding up the drill, whereby the factor of oil-pressure upon the drill is practically eliminated. The ducts $p'$ and $p'$ also convey oil to transverse openings $p^2 p^2$, formed in the plate $P^4$, which is secured by means of screws $P^5$ to the bottom of the block $M^6$ for the purpose of confining therein the packing $P^6$, which is employed to pack the lower end of the oil-tube $M^4$, the said packing being formed with an annular passage which receives oil under pressure through the openings $p^2 p^2$, whereby the packing is expanded and kept tight and oil prevented from working up around the outside of the tube $M^4$.

In view of the changes suggested and of others which may obviously be made I would have it understood that I do not limit myself to the exact construction herein shown and described, but hold myself at liberty to make such changes as fairly fall within the spirit and scope of my invention. Thus the guides and the torsion and pressure knock-off devices might be employed to advantage in a drilling-machine in which the drill is located either horizontally or vertically, but arranged to drill downward instead of upward, though, of course, I altogether prefer the arrangement shown on account of the great facility it offers in the disposition of the chips.

Having fully described my invention, what I claim as new, and desire to secure by Letters Patent, is—

1. In a machine for drilling gun-barrels, the combination with a vertically-arranged revolving tubular spindle, an adjustable gage located at the upper end thereof, a chuck located at the lower end thereof, a vertically-movable non-rotatable drill located below and in line with the said spindle and entering the lower end of the gun-barrel held and rotated thereby, movable guides for supporting the drill against flexure, and means for automatically stopping the drill when the torsion imposed upon it by the act of drilling exceeds a predetermined amount.

2. In a machine for drilling gun-barrels, the combination with a vertically-arranged, revolving, tubular spindle adapted to receive, hold and rotate a gun-barrel, a drill located below and in line with the said spindle and entering the lower end of the barrel held thereby, and a vertically-arranged, rod-like gage located at the upper end of the spindle and having a conical socket formed in its lower end, and means for holding the said gage in any desired position of adjustment within the upper end of the spindle.

3. In a machine for drilling gun-barrels, the combination with a vertically-arranged drill, of means for reciprocating the same, and two or more drill-guides constructed and arranged to be automatically picked up one after the other as the drill is lifted and enters the barrel from below.

4. In a machine for drilling gun-barrels, the combination with a vertically-arranged drill, of means for reciprocating the same, and two or more drill-guides constructed and arranged to be automatically picked up one after the other as the drill is lifted and enters the barrel from below, the said guides being differentiated from each other so that they will come together as they are picked up.

5. In a machine for drilling gun-barrels, the combination with a vertically-arranged drill, of means for reciprocating the same, and two or more drill-guides having their legs dodged so as to clear each other and permit the guides to come together as they are successively picked up as the drill is lifted and enters the gun-barrel from below.

6. In a machine for drilling gun-barrels, the combination with two or more drill-guides arranged to be automatically picked up one after the other by the drill, of means for connecting the guides together and counterbalancing them in their guideways.

7. In a machine for drilling gun-barrels, the combination with two or more drill-guides arranged to be automatically picked up one after the other as they are lifted by the drill, a chain connecting the said guides together, and a counterbalance attached to the said chain and counterbalancing the said guides in their guideways.

8. In a machine for drilling gun-barrels, the combination with the drill thereof, of feeding connections, and a torsion knock-off device comprising a bushing frictionally coupled with the drill, and normally holding the same against rotation, but yielding and allowing the drill to rotate and actuate the said device when the torsion imposed upon the drill exceeds the friction imposed upon the bushing.

9. In a machine for drilling gun-barrels, the combination with the drill thereof, of feeding connections therefor, and a torsion knock-off device comprising a conical bushing coupled with the drill which is free to reciprocate through it a gate in which the said bushing is mounted, and in which it is frictionally held against rotation, and means acted upon by the bushing when it rotates for cutting off the power from the said connections.

10. In a machine for drilling gun-barrels, the combination with the drill thereof, of a pressure knock-off device comprising a spring, a plunger supported thereby and in turn supporting the drill, and means connected with the drill and operated when the same moves endwise, for cutting off the power from the drill.

11. In a machine for drilling gun-barrels, the combination with a vertically-arranged revolving tubular spindle adapted to receive a gun-barrel, of an adjustable gage located at the upper end of the said spindle, a chuck located at the lower end of the said spindle, a vertically-movable drill located at the lower end of the said spindle, having a longitudinal oil-passage, and an external longitudinal chip-discharge passage, guides for the said drill, means for forcing oil up into the drill, and means for automatically stopping the machine when the torsion imposed upon the drill by the act of drilling exceeds a predetermined amount.

In testimony whereof I have signed this specification in the presence of two subscribing witnesses.

WILLIAM MASON.

Witnesses:
DANIEL H. VEADER,
THOMAS C. JOHNSON.